United States Patent
Gibbons

(10) Patent No.: US 11,173,696 B2
(45) Date of Patent: Nov. 16, 2021

(54) CONDUCTION HEATING FOR HVA LAMINATION PROCESS

(71) Applicant: B/E Aerospace, Inc., Winston-Salem, NC (US)

(72) Inventor: Andrew Gibbons, Newry (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 64 days.

(21) Appl. No.: 16/529,015

(22) Filed: Aug. 1, 2019

(65) Prior Publication Data
US 2021/0031503 A1  Feb. 4, 2021

(51) Int. Cl.
| B32B 37/06 | (2006.01) |
| B32B 37/10 | (2006.01) |
| B32B 37/12 | (2006.01) |
| B32B 37/18 | (2006.01) |

(52) U.S. Cl.
CPC .......... *B32B 37/06* (2013.01); *B32B 37/1018* (2013.01); *B32B 37/1207* (2013.01); *B32B 37/182* (2013.01)

(58) Field of Classification Search
CPC . B32B 37/06; B32B 37/1018; B32B 37/1207; B32B 37/182; B32B 37/1009; B32B 37/04; B32B 38/0036; B32B 38/1866; B32B 38/1858; B32B 38/004; B29C 66/3464; B29C 66/0242; B29C 66/81455; B29C 63/0073; B29C 63/04; B29C 53/84; B29C 51/421; B29C 51/34; B29C 51/162; B29C 63/16; B29C 2791/006; Y10T 156/1028; Y10T 156/103; Y10T 156/1031; B30B 5/02

USPC .... 156/212, 213, 214, 285, 286, 322, 583.3, 156/309.9
See application file for complete search history.

(56) References Cited

U.S. PATENT DOCUMENTS

| 4,447,282 A * | 5/1984 | Valerio .................... B27D 1/08 156/212 |
| 5,225,027 A | 7/1993 | Diekwisch |
| 2005/0178428 A1 * | 8/2005 | Laaly .................... H01L 31/044 136/251 |

(Continued)

FOREIGN PATENT DOCUMENTS

EP  3771559 A1  2/2021

OTHER PUBLICATIONS

Search Report for European Application No. 19216882 dated Mar. 2, 2021, 2 pages.

*Primary Examiner* — John L Goff II
(74) *Attorney, Agent, or Firm* — Suiter Swantz pc llo

(57) ABSTRACT

A method of laminating a contoured part including heating a flexible membrane, positioning the heated flexible membrane into thermal contact with the contoured part, maintaining the heated flexible membrane in thermal contact with the contoured part to raise a surface temperature of the contoured part, moving the flexible membrane out of thermal contact with the contoured part, positioning a laminate between the flexible membrane and the contoured part, conforming the laminate to a surface of the contoured part, and heating the conformed laminate and contoured part to adhere the conformed laminate to the surface of the contoured part. The laminate may be conformed to a surface of the contoured part by applying a vacuum between the flexible membrane and the contoured part.

14 Claims, 8 Drawing Sheets

(56) References Cited

U.S. PATENT DOCUMENTS

2016/0126361 A1* 5/2016 Zhao .................. H01L 31/0488
136/251

* cited by examiner

CONDUCTION HEATING FOR HVA LAMINATION PROCESS

BACKGROUND

Thin film decorative laminates are often used to create cosmetic finishes of preferred color and texture on the surface of manufactured products. Various types of adhesive systems may be used to bond a decorative laminate to a substrate surface. One adhesive type used for applying laminates is a hot melt adhesive, which is applied to the non-cosmetic side of a laminate by the laminate manufacturer. These adhesives become activated by heat provided while the laminate is applied to the substrate product.

Current industry practice is to use a machine known as a Hot Vacuum Applicator (HVA) machine in which the part to which a laminate is to be applied is supported, the laminate is lowered onto the part from above, and a flexible membrane is positioned over the laminate to form an air tight seal. A vacuum is then drawn, forming the flexible membrane and laminate onto the part while heat is applied. A typical HVA machine is set to dwell or bake the membrane, laminate, and part together as a stack until a critical activation temperature is reached at all regions of the laminate in contact with the part to melt and adhere the adhesive to the part, thus bonding the laminate to the surface of the part.

A typical bank of infrared (IR) heaters including lamps uniformly spaced in an array is best suited for uniformly heating generally planar structures. Parts that are highly contoured, for example having convex and/or concave surface features, may be non-uniformly heated or may reach uniform temperatures only through lengthy baking procedures using slowly rising temperatures. Such practices are energy inefficient and require considerable processing time per part.

Accordingly, an improved HVA method is needed in which parts of all shapes, including those with complex or highly contoured surfaces, can be laminated with time and energy efficiencies.

SUMMARY OF THE INVENTIVE ASPECTS

To achieve the foregoing and other advantages, the inventive aspects disclosed herein are directed to a method of laminating a contoured part including heating a flexible membrane, positioning the heated flexible membrane into thermal contact with the contoured part, maintaining the heated flexible membrane in thermal contact with the contoured part to raise a surface temperature of the contoured part, moving the flexible membrane out of thermal contact with the contoured part, positioning a laminate between the flexible membrane and the contoured part, conforming the laminate to a surface of the contoured part, and heating the conformed laminate and contoured part to adhere the conformed laminate to the surface of the contoured part.

In some embodiments, the laminate is conformed to a surface of the contoured part by applying a vacuum between the flexible membrane and the contoured part.

In some embodiments, the laminate includes a first side for facing the contoured part, a second side for facing the flexible membrane, and a heat activated adhesive applied on the first side.

In some embodiments, heating the conformed laminate and contoured part includes heating the heat activated adhesive at least to an activation temperature at which the heat activated adhesive melts.

In some embodiments, heating the flexible membrane includes heating the flexible membrane to a predetermined temperature greater than the activation temperature.

In some embodiments, the predetermined temperature is at least fifty degrees Celsius greater than the activation temperature.

In some embodiments, the predetermined temperature is at least eighty degrees Celsius greater than the activation temperature.

In some embodiments, the predetermined temperature is at least one hundred degrees Celsius greater than the activation temperature.

In some embodiments, before heating the heat activated adhesive at least to the activation temperature, the laminate is conformed to the surface of the contoured part until the heat activated adhesive cools to a setting temperature that is below the activation temperature.

In some embodiments, the activation temperature is at least one hundred degrees Celsius, and, the setting temperature is below fifty degrees Celsius.

In some embodiments, positioning the heated flexible membrane into thermal contact with the contoured part includes applying a vacuum between the flexible membrane and the contoured part.

In some embodiments, maintaining the heated flexible membrane in thermal contact with the contoured part includes maintaining the vacuum.

In some embodiments, heating the flexible membrane and heating the conformed laminate and contoured part include heating with a common heat source.

In some embodiments, positioning the heated flexible membrane into thermal contact with the contoured part includes conforming the heated flexible membrane to the surface of the contoured part.

In some embodiments, conforming the heated flexible membrane to the surface of the contoured part includes applying a vacuum between the flexible membrane and the contoured part.

In another aspect, the inventive concepts disclosed herein are directed to a method of preheating a contoured part to which a laminate is to be applied. The method includes heating a flexible membrane, positioning the heated flexible membrane into thermal contact with the contoured part, maintaining the heated flexible membrane in thermal contact with the contoured part to raise a surface temperature of the contoured part, and moving the flexible membrane out of thermal contact with the contoured part.

In some embodiments, positioning the heated flexible membrane into thermal contact with the contoured part includes applying a vacuum between the flexible membrane and the contoured part.

In some embodiments, maintaining the heated flexible membrane in thermal contact with the contoured part includes maintaining the vacuum.

In some embodiments, applying a vacuum between the heated flexible membrane and the contoured part includes conforming the heated flexible membrane to a surface of the contoured part.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

Figure 1:
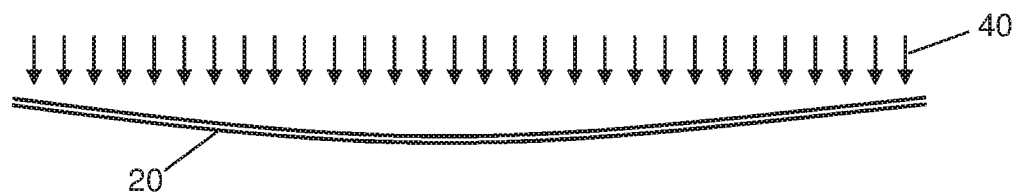
FIG. 1 shows the heating of a flexible membrane for use in laminating a part in an inventive HVA method according to the present disclosure.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

These descriptions, of which the drawings are a part, detail a method of applying a laminate to a part in a Hot Vacuum Applicator (HVA) process or method. The inventive method or process utilizes a flexible membrane to apply a laminate to the part in an HVA process. Preceding the laminate/adhesive application, the part is preheated by the heated flexible membrane thru close conformed contact, such as with the application of a vacuum, such that the part is heated (i.e., preheated) prior to the introduction of the laminate/adhesive between the flexible membrane and part. An advantage of preheating the part to be laminated is that heat transfer from the preheated part nearly instantaneously brings the adhesive on the laminate up to its activation temperature, in contrast to existing conventional methods in which a cool part has a chilling effect on the laminate/adhesive. This inventive benefit advantageously saves considerable time and energy in laminating a part, and particularly a contoured part, relative to existing conventional lamination methods in which a membrane, laminate, and cool part are stacked, a vacuum formed, and the stack heated to a process temperature required for lamination bonding without preheating the part.

The inventive method or process particularly benefits, for example, the lamination of highly contoured parts, where previous methods required considerable dwell or bake time of the stack in order to bring all portions of the laminate and part to a required activation temperature, at which the laminate adhesive melts bonding the laminate and part. To prepare the flexible membrane to preheat the part, prior to the introduction of the laminate, the membrane is superheated to a temperature above the activation temperature of the adhesive, thus imparting into the membrane sufficient thermal energy to transfer heat to the part by conduction. By the inventive use of a heated HVA flexible membrane to both preheat the part by close conformed contact and heat conduction, and subsequently conform the laminate to the preheated part, a minimum necessary delivery of heat energy into the part is achieved along the contoured surface of the part saving both time and energy. The process time for laminating a part, and the energy consumed, can each be significantly reduced while the bond strength between the laminate and the part can meet or that of prior standards or be improved.

Figure 2:
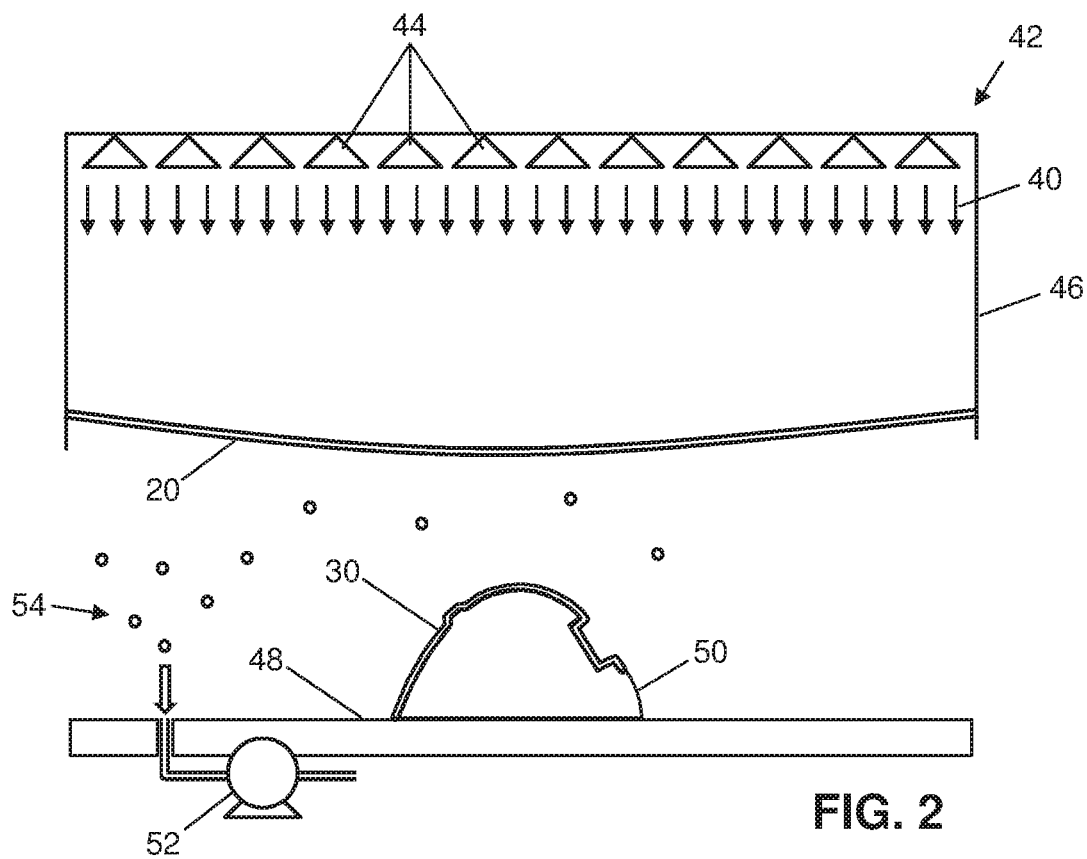
FIG. 2 shows the membrane heated in FIG. 1 positioned above a supported contoured part, which is to be laminated, in preparation for preheating the part.
Figure 6A:
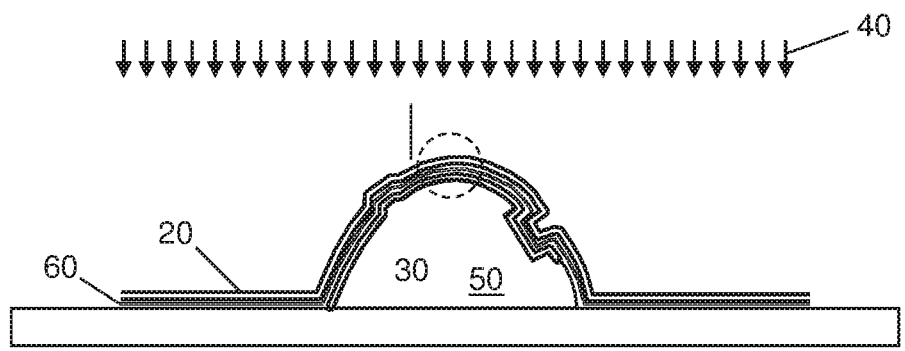
FIG. 6A shows the laminate of FIG. 5 conformed to the surface of the contoured part, for example by vacuum.
Figure 6B:
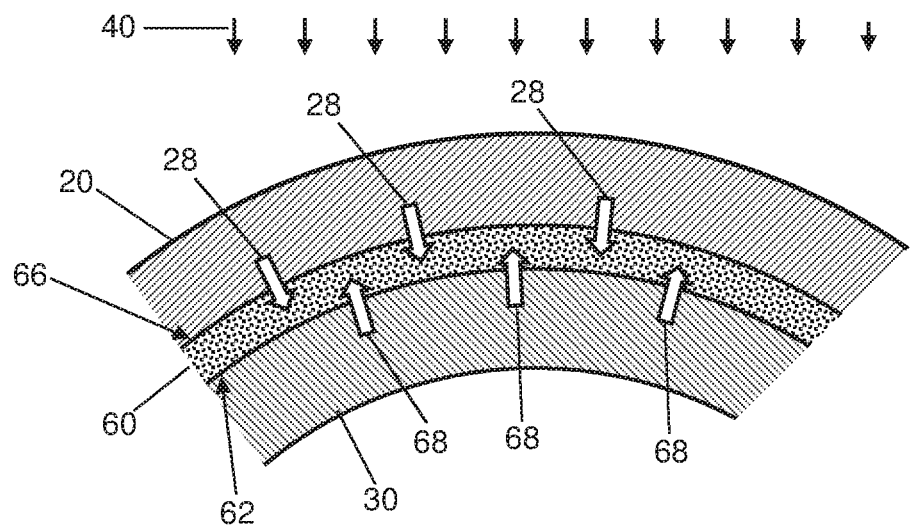
FIG. 6B is an enlarged view of a portion of the membrane, conformed laminate, and contoured part of FIG. 6A.
Figure 7:
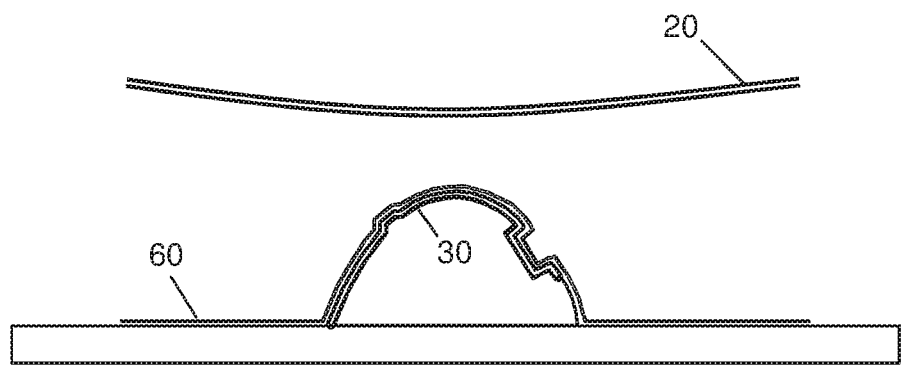
FIG. 7 shows the membrane moved out of thermal contact with the laminate and contoured part of FIG. 6A.
Figure 8:
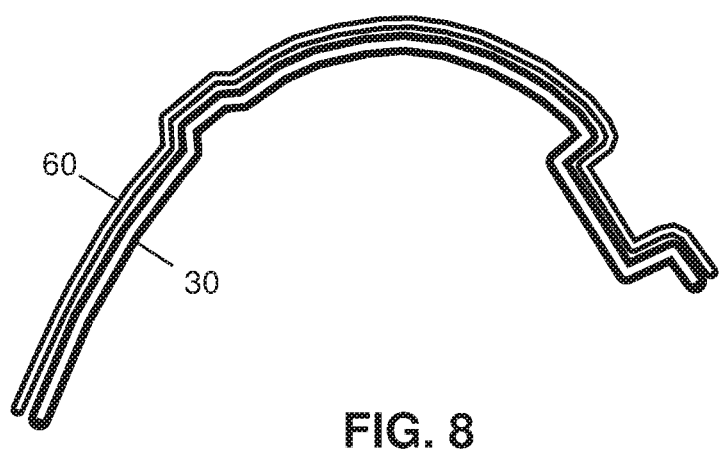
FIG. 8 shows the contoured part laminated according to FIGS. 1-7.

FIGS. 1-8 sequentially illustrate steps in laminating a contoured part according to the inventive method or process. A non-limiting example of a part is represented for a consistent example throughout the drawings to foster an understanding of the inventive process or method. The part represents many types of components and structures on which a laminate is to be applied for decorative, colorizing, texturizing, protective, or strengthening purposes. FIG. 2, for example, particularly shows the part 30 mounted on a supporting fixture prior to the application of a laminate. FIG. 8 shows the part 30 dismounted from the supporting fixture and with a laminate 60 applied. By illustration of this example part in these and the other drawings, no limitation is made upon the inventive process or method.

The part 30 is chosen in the example of the drawings for having a contoured, generally non-planar geometry, with surface features that are inward recessed or concave, and surface features that are outward protruding or convex. A part to which a lamination is applied by the inventive method or process can be planar or non-planar and may have areas of each. The inventive method or process is particularly useful for applying laminates to non-planar and planar panels for example, which may be interior aircraft cabin components for use as walls, dividers, partitions and other large to small area parts.

Figure 3A:
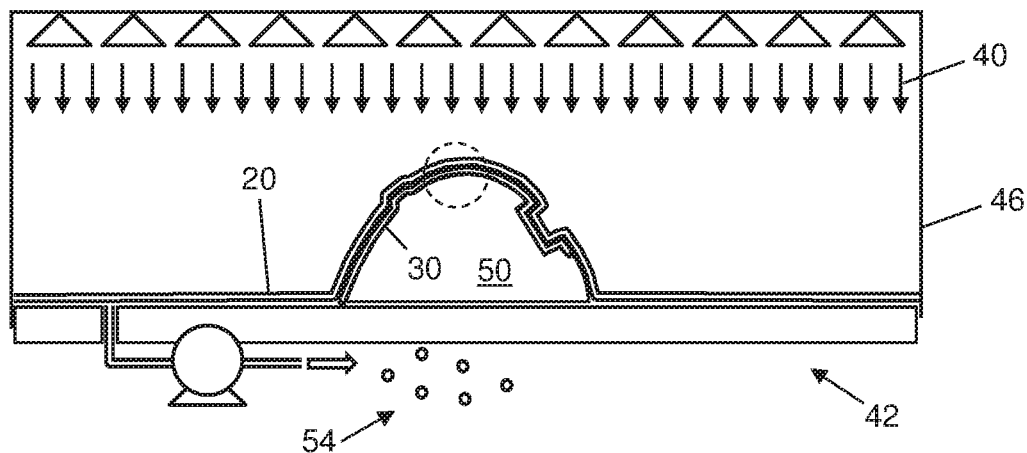
FIG. 3A shows the heated membrane and part of FIG. 2, with the heated membrane positioned into thermal contact with the contoured part to preheat the part.
Figure 4:
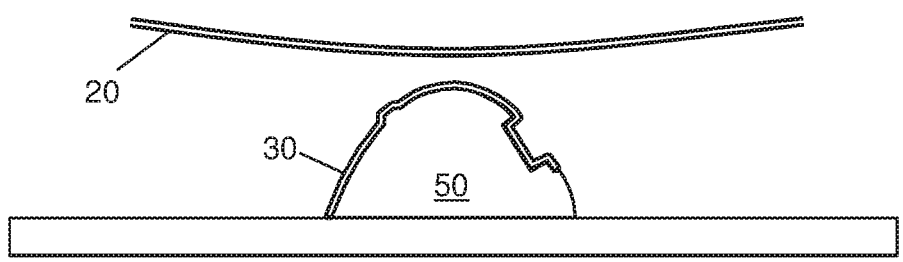
FIG. 4 shows the membrane moved out of thermal contact with the contoured part preheated in FIG. 3A.

FIG. 1 particularly shows a flexible membrane 20 being heated for use in laminating the part 30. The flexible membrane 20 is generally fluid impermeable. The membrane 20 can be constructed of or with silicon. When deformation forces are applied, the flexible membrane 20 can closely conform to the outer surface of arbitrarily contoured parts, for example as shown in FIG. 3A, by mechanical stretching, and/or vacuum. The flexible membrane is resilient, returning to its neutral generally planar or sheet form as represented in FIGS. 1 and 4 when deformation forces as removed. The membrane is preferably durable and able to undergo many transitions from neutral, to conformed, and back to neutral many times without replacement.

A row of arrows, referenced as heating 40, is directed toward the membrane 20 in FIG. 1 to represent heating elements, heat flux, or radiant heat energy. The heating 40 of the flexible membrane 20 can be conducted using an HVA machine 42 as represented in FIG. 2, in which a bank of infrared (IR) lamps serving as heaters 44 are uniformly spaced in a planar array. The periphery of the flexible membrane 20 in that example is attached to a hood 46 that carries the heaters 44. The machine 42 raises (FIG. 2) and lowers (FIG. 3A) the hood 46 relative to a table 48 on which the part 30 to be laminated is supported by a supporting fixture 50. The hood 46 and table 48 form an approximate peripheral seal as the hood is lowered. The machine 42 includes pumping or vacuum equipment 52 that evacuates air 54 between the membrane 20 and part 30, thus applying a vacuum and conforming the membrane 20 to the part 30 in close conformed contact as shown in FIG. 3A. As the air 54 is evacuated, a pressure differential drop develops from ambient conditions outside or above the membrane 20 to the evacuated interior space between the membrane 20 and part 30, thus stretching and closely conforming the flexible membrane 20 to the part 30.

The flexible membrane 20, the part 30, and the heating 40 are described and illustrated without further detailing the HVA machine 42 and without necessitating its use in the described inventive method or process. Returning to FIG. 1, and in terms generic as to whether the particularly illustrated HVA machine is used, FIG. 1 particularly shows the heating 40 of the flexible membrane 20 for use in laminating the part 30. In order to impart sufficient thermal energy into the membrane 20 to sufficiently preheat the part 30, the membrane 20 is superheated to a temperature above the activation temperature of the adhesive of a selected laminate. For example, the membrane 20 in some examples is heated to at least fifty degrees Celsius (50° C.) above the activation temperature, preferably at least eighty degrees Celsius (80° C.) above the activation temperature, more preferably at least one hundred degrees Celsius (100° C.) above the activation temperature, and even more preferably at least one hundred and twenty degrees Celsius (120° C.) above the activation temperature. In a particular example, in which the activation temperature of the selected laminate is one hundred and three degrees Celsius (103° C.), the membrane 20 is heated to at least one hundred degrees Celsius (100° C.) above the activation temperature to a preheated temperature of at least two hundred and three degrees Celsius (203° C.). As selected membranes may vary in differing implementations of the inventive method or process, and as selected laminates and adhesives may vary, not all implementations will follow this particular example.

In differing implementations, the material, density, and thermal properties such as heat capacity and thermal conductance of the membrane 20, laminate, and part 30 may differ. Thus, specific temperatures and dwell times can be determined in establishing any particular implementation in view of these descriptions.

FIG. 2 returns to the example in which an HVA machine is used to heat the membrane 20 and shows the heated membrane 20 positioned above the supported contoured part 30, which is to be laminated, in preparation for preheating the part 30. In FIG. 3A, the heated flexible membrane 20 is positioned into thermal contact with the contoured part 30, for example, by lowering of the hood 46 and evacuation of the air 54 previously between the membrane 20 and part 30, thus conforming the heated membrane 20 to the part 30 in close conformed contact.

Figure 3B:
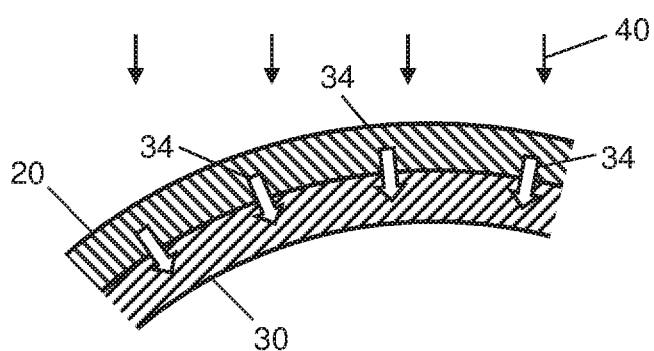
FIG. 3B is an enlarged view of a portion of the heated membrane and the contoured part of FIG. 3A.

FIG. 3B is an enlarged view of a portion 36, referenced in FIG. 3A, of the heated membrane 20 and the contoured part 30. FIG. 3B illustrates the heated flexible membrane 20 conforming to the part 30 in thermal contact. Thermal energy is transferred by conductance from the heated flexible membrane 20 to the contoured part 30 as represented by heat flow 34. The flexible membrane 20 is maintained in thermal contact with the contoured part 30 as shown in FIGS. 3A and 3B for a dwell time to raise the surface temperature of the contoured part 30. For a thin part 30, a consistent temperature may be reached throughout. For thicker parts, a skin or surface depth may be particularly heated while deeper substrate portions further from the surface may be less heated or unaffected. As represented in FIGS. 3A and 3B, heating 40 of the flexible membrane 20, for example by the heaters 44 of the HVA machine 42, may continue as the flexible membrane 20 is maintained in thermal contact with the contoured part 30.

FIG. 4 shows the membrane 20 moved out of thermal contact with the contoured part 30. At this stage, the contoured part 30 is preheated and ready for laminate application. Subsequently, in FIG. 5, a laminate 60 is positioned between the flexible membrane 20 and the preheated contoured part 30. The laminate 60, having a first side 62 on which a heat activated adhesive 64 is applied, and a second side 66 opposite the first side, is oriented with the first side 62 and adhesive 64 facing the preheated contoured part 30. Accordingly, the second side 66 faces the flexible membrane 20. The laminate 60 is then conformed to the surface 32 of the contoured part 30 into close conformed and thermal contact with the contoured part 30 as shown in FIG. 6A. Once the membrane 20 is moved out of thermal contact with the contoured part 30 (FIG. 4) the laminate 60 is brought into position (FIG. 5), and conformed into thermal contact (FIGS. 6A-6B) in a prompt manner to assure the contoured part 30 has not cooled greatly from its preheated condition.

Figure 5:
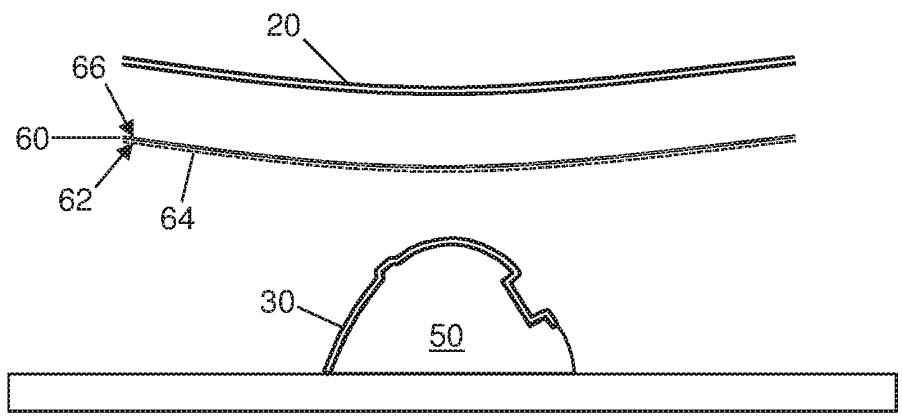
FIG. 5 shows a laminate positioned between the membrane and the preheated contoured part of FIG. 4.

In returning to the example in which the HVA machine is used, the hood 46 is raised to lift the flexible membrane 20 as in FIG. 4 from the preheated contoured part 30, permitting the laminate 60 to be introduced as in FIG. 5, and the hood 46 is lowered and air previously between the membrane 20 and part 30 is evacuated, which traps and conforms the laminate 60 as shown in FIG. 6A by pressure differential.

As represented in FIGS. 6A and 6B, heating 40 of the stacked contoured part 30, conformed laminate 60, and flexible membrane 20 may continue as the flexible membrane 20 is maintained in thermal contact with the contoured part 30. Heating of the conformed laminate 60 and contoured part 30 may continue or be provided, for example, by heating of the flexible membrane 20 by the heaters 44 of the HVA machine as the flexible membrane 20 is maintained in thermal contact with the conformed laminate 60, and the conformed laminate is maintained in thermal contact with the preheated contoured part 30. Thus, as illustrated, heating of the flexible membrane 20 and heating the conformed laminate 60 and preheated contoured part 30 may be applied by a common heat source, for example the heaters 44. In other embodiments, multiple heat sources may be used, for example by the heaters 44 from above and a separate heat source from below.

FIG. 6B is an enlarged view of a portion 58, referenced in FIG. 6A, of the conformed membrane 20, conformed laminate 60, and contoured part 30. FIG. 6B shows the first side 62 of the laminate 60 in close conformed and thermal contact with the preheated contoured part 30, and the second side 66 of the laminate in close conformed and thermal contact with the flexible membrane 20. FIG. 6B shows that the conformed laminate 60 and contoured part 30 are heated 40 to adhere the conformed laminate to the surface 32 of the contoured part 30. For example, the conformed laminate 60 and contoured part 30 are heated to heat the heat activated adhesive 64 (FIG. 7) at least to an activation temperature at which the heat activated adhesive melts.

FIG. 6B particularly shows that thermal energy is transferred by conductance from the heated flexible membrane 20 to the laminate 60 as represented by heat flow 28, and thermal energy is transferred by conductance from the preheated contoured part 30 to the laminate as represented by oppositely directed heat flow 68. Thus, the laminate 60 is heated from two opposing sides in the inventive method or process.

In at least one example, the condition represented in FIGS. 6A and 6B is maintained for a dwell time to maintain the heat activated adhesive 64 at or above the activation temperature to facilitate adhesion to the contoured part 30. For example, a heat activated adhesive that melts can flow or deform into bonding condition with the contoured part 30. The dwell time also permits time for any internal stresses in the conformed laminate 60 to decrease or abate by plastic deformation as the laminate assumes its new shape in close conformation with the contoured part 30. In a particular example in which the activation temperature of the selected laminate is one hundred and three degrees Celsius (103° C.), the dwell time may be approximately four minutes. Other dwell times are within the scope of these descriptions according to other selected laminates and their heat activated adhesives for example.

In at least one example, after heating the heat activated adhesive 64 at least to the activation temperature, the laminate 60 is maintained as conformed to the surface 32 of the contoured part 30 until the heat activated adhesive cools to a setting temperature that is below the activation temperature. This is represented by the condition of the laminate 60 conformed to the contoured part 30 as in FIGS. 6A and 6B without the heating. In returning to the example in which the HVA machine 42 is used, heating 40 is discontinued as the stacked contoured part 30, conformed laminate 60, and conformed membrane 20 cool. The pressure differential applied by vacuum is maintained to keep the stack in the conformed configuration as cooling occurs. In a particular example, in which the activation temperature of the selected laminate is one hundred and three degrees Celsius (103° C.), the setting temperature may be approximately forty degree Celsius (40° C.). Other setting temperatures are within the scope of these descriptions according to other selected laminates and their heat activated adhesives for example.

After the laminate 60 is adhered to the contoured part 30, for example by cooling of the heat activated adhesive 62 to or below the setting temperature, the membrane 20 is moved out of thermal contact with the laminate and contoured part 30 as shown in FIG. 7. The now laminated contoured part 30 can then be removed from the supporting fixture 50 and table as shown in FIG. 8. Any excess laminate material can be trimmed from the periphery and from any apertures or holes in the design of the contoured part 30.

In a production environment in which multiple contoured parts are to be laminated, a next contoured part 30 is mounted on the same or another supporting fixture 50, and the flexible membrane 20 is again heated, as represented in FIG. 1, in preparation for preheating the next contoured part 30.

Figure 9:
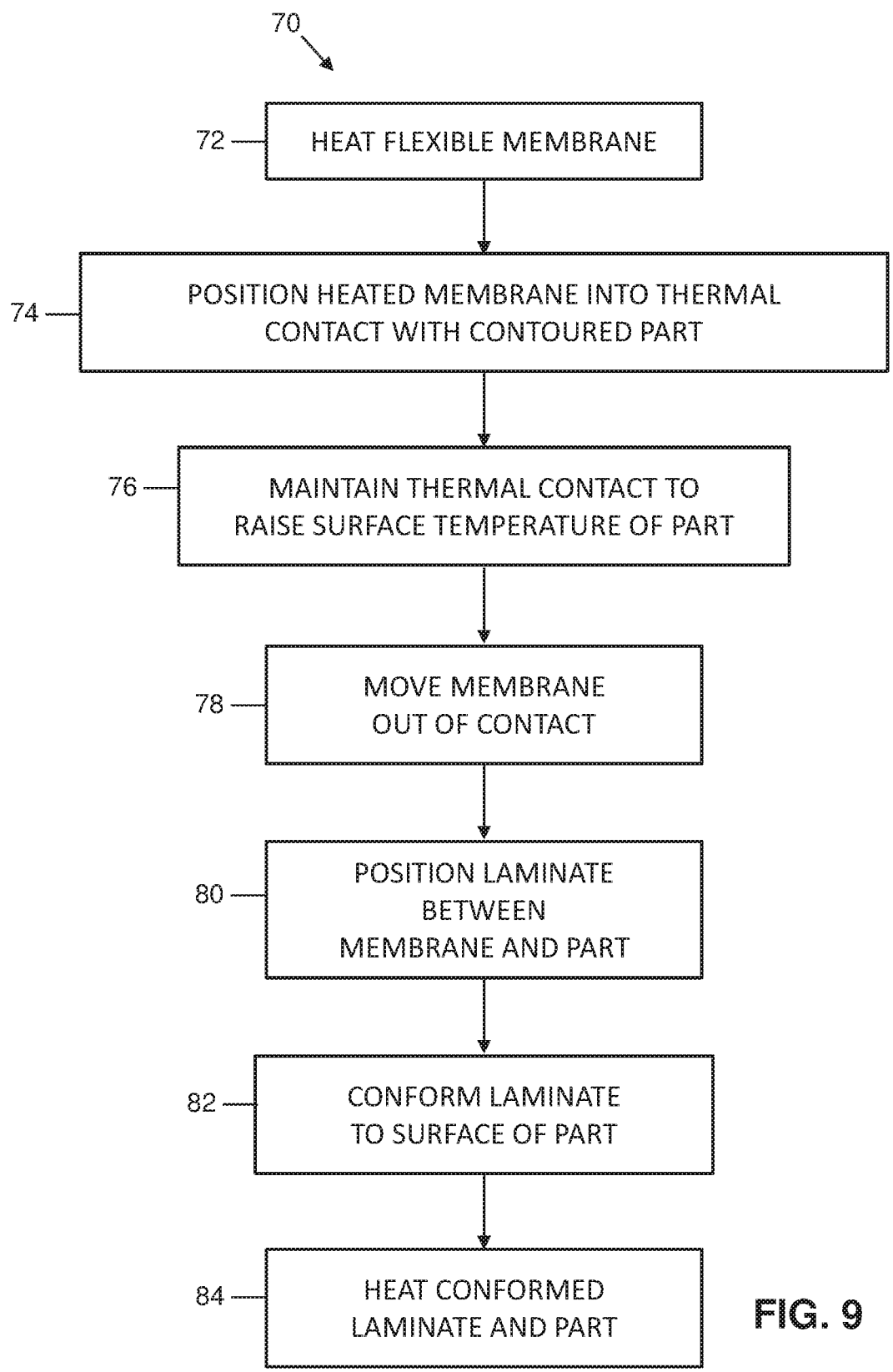
FIG. 9 is a flow chart representing a method, according to the present disclosure, of laminating a contoured part.
Figure 10:
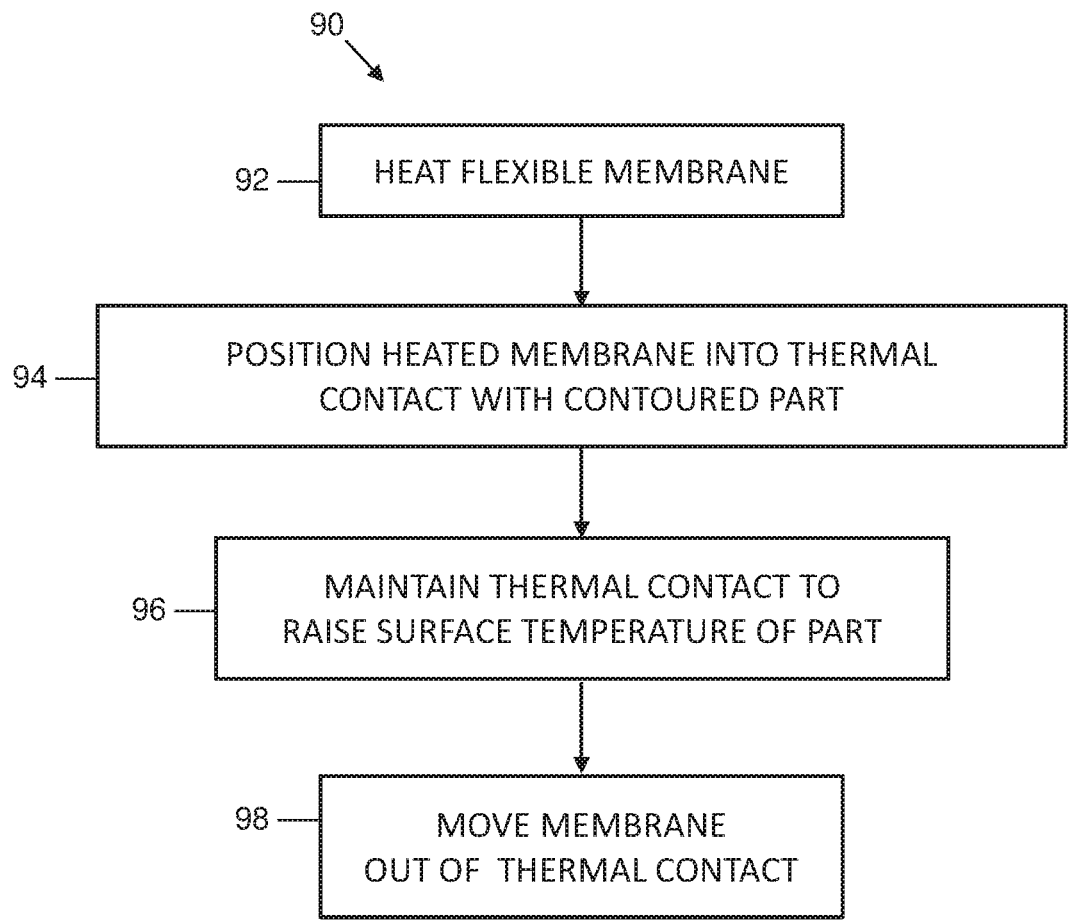
FIG. 10 is a flow chart representing a method, according to the present disclosure, of preheating a contoured part to which a laminate is to be applied.

FIG. 9 is a flow chart representing a method of laminating a contoured part. FIG. 10 is a flow chart representing a method of preheating a contoured part to which a laminate is to be applied. Both methods are described in the following with reference to numbered steps as shown in the respective drawings and with additional reference to FIGS. 1-8, which illustrate exemplary but non-limiting implementations by which the methods of FIGS. 9 and 10 can be practiced. The methods thus described should be understood in view of these combined descriptions as a whole, in view of which modifications and variation are possible. The methods of FIGS. 9 and 10 can be practiced by other implementations than those expressly illustrated in FIGS. 1-8, and the implementations taught by FIGS. 1-8 and their descriptions can practice methods other than those of FIGS. 9 and 10. Furthermore, steps preceding, following, and intervening between the steps expressly shown in FIGS. 9 and 10 may be added without escaping the scope of these descriptions.

FIG. 9, in particular, represents a method 70, according to the present disclosure, of laminating a contoured part. In a first expressly shown step 72, a flexible membrane is heated. See FIGS. 1 and 2, and descriptions thereof, for particular non-limiting implementations of heating a flexible membrane according to step 72.

In step 74, the heated flexible membrane is positioned into thermal contact with the contoured part. In step 76, the heated flexible membrane is maintained in thermal contact with the contoured part to raise a surface temperature of the contoured part. FIGS. 3A and 3B and descriptions thereof detail a particular non-limiting implementation according to steps 74 and 76. The flexible membrane 20, the part 30, and the machine 42 particularly illustrated in FIGS. 3A and 3B are provided as non-limiting examples.

In step 78, the flexible membrane is moved out of thermal contact with the contoured part. For example, as described with reference to FIG. 4, and in the example in which the HVA machine 42 (FIGS. 3A-3) is used, the hood 46 is raised to lift the flexible membrane 20 from the preheated contoured part 30, permitting the permitting the laminate 60 to be introduced as in FIG. 5.

In step 80, a laminate is positioned between the flexible membrane and the contoured part. See, for example, the implementation illustrated and described with reference to FIG. 5. Placement of the laminate 60 may be practiced manually or may be automated. Where the laminate and part 30 have particular features requiring alignment, registration marks or features may facilitate accurate placement.

In step 82, the laminate is conformed to the surface of the contoured part. See, for example, the implementation illustrated and described with reference to FIGS. 6A and 6B, in which, in the example in which the HVA machine 42 (FIGS. 3A-3B) is used, the hood 46 is lowered and air previously between the membrane 20 and part 30 is evacuated, trapping and conforming the laminate 60 as shown in FIG. 6A by pressure differential. The temperature at which the laminate may be conformed to the substrate part can be around, for example, 30° C. below the activation temperature of the adhesive. This is because the softening temperature of decorative laminate products is typically lower than the activation/melt temperature of the adhesive. The laminate conforming may therefore take place before the laminate and adhesive has reached the adhesive activation temperature.

In step 84 (FIG. 9), the conformed laminate and contoured part are heated to adhere the conformed laminate to the surface of the contoured part. See, for example, the implementation illustrated and described with reference to FIGS.

6A and 6B, in which heating 40 of the stacked contoured part 30, conformed laminate 60, and flexible membrane 20 is shown. In the example in which the HVA machine 42 is used, the heaters 44 heat the stacked flexible membrane 20, conformed laminate 60, and contoured part 30 from above. Other implementations may use, additionally or alternatively, other heating elements, for example applying heat from below.

FIG. 10 is a flow chart representing a method 90 of preheating a contoured part to which a laminate is to be applied. In step 92, a flexible membrane is heated. In step 94, the heated flexible membrane is positioned into thermal contact with the contoured part. In step 96, the heated flexible membrane is maintained in thermal contact with the contoured part to raise a surface temperature of the contoured part. Thus, steps 92-96 of the method 90 correspond to the steps 72-76 of the method 70 (FIG. 9), and examples of implementations are provided in FIGS. 1-3B. In step 98, the flexible membrane is moved out of thermal contact with the contoured part, for example, as described with reference to FIG. 4. Thus, in the method 90, a contoured part is preheated in preparation for applying a laminate to the part. Further steps may follow, for example, as expressly included in the method 80. The method 90, however, is novel and non-obvious in that contoured parts were not previously preheated by conduction by use of a heated flexible membrane. Instead, a membrane, laminate, and part were stacked and heated together from above until a critical activation temperature was reached.

Thus, innovations described and illustrated herein include: a) pre-heating and sustaining the membrane at an elevated temperature prior to commencing the laminating cycle; b) raising the temperature of the membrane to a superheated state, for example 80° C. or greater above a standard HVA processing temperatures; c) pre-heating the substrate material immediately prior to the application of the laminate by bringing the super-heated membrane into direct contact with the part and applying vacuum pressure; d) sustaining the heating of the membrane in conjunction with pressurized contact with the substrate for a short time to bring the temperature of the surface of the substrate close to standard HVA processing temperatures; and e) releasing and removing the membrane followed by application of the laminate sufficiently quickly to ensure that the substrate surface does not cool significantly and remains close to standard HVA processing temperatures as the laminate makes contact. The surface of the substrate part can thus be heated to the target process temperature by direct contact with a super-heated membrane.

The inventive method, and implementations thereof, facilitate greatly shortened process cycle times, and increase the bond strength of a laminate to the substrate material, thus reducing the risk of in-service failure of laminated parts. Greater uniformity in adhesion strength may also be achieved. Less energy is input into a substrate part using this heating technique, reducing the risk of heat deformation and increasing the rate at which the part may be cooled back to room temperature. In addition, the new method or process can be carried out in an elevated temperature environment, such as within a conventional oven at 80° C., and contrasting this to existing conventional oven systems that need to be sustained at around 120° C.

The speed at which the substrate surface can be brought to the required process temperature is much faster through direct contact with the super-heated membrane through other possible techniques, such as heating the part first by infra-red radiation, or by placing the part in a pre-heated (convection) oven.

Heat intensity that impinges on a surface from a point source is proportional to the inverse of the square of the distance from the source of the heat. This means that a radiating heat source (e.g. IR lamps) that is optimized for the heating of laminate material (nominally flat) is not optimized for heating a contoured part. Areas of the substrate part that are further away from the heat source heat up much more slowly than areas closer to the source. This leads to uneven surface temperature over a contoured part. Some areas may become too hot, resulting in damaged material, while other areas may be too cold, resulting in poor adhesion. Using heat transfer through contact of the part with a pre-heated membrane in lieu of irradiation of the part provides a much more even temperature across the part surface.

The time taken to cool parts at the end of a process cycle is affected by the heat energy stored within the parts. The HVA process requires the substrate to have adequate surface temperature to allow for melting of the adhesive. An elevated through-body temperature, far from the surface to which a laminate is to be applied, is not needed for the process. The technique of heating the substrate using the hot membrane allows for the required surface temperatures to be reached while minimizing overall heat transfer deep into the part. The lower heat energy in the part results in faster cooling times.

Figure 11:
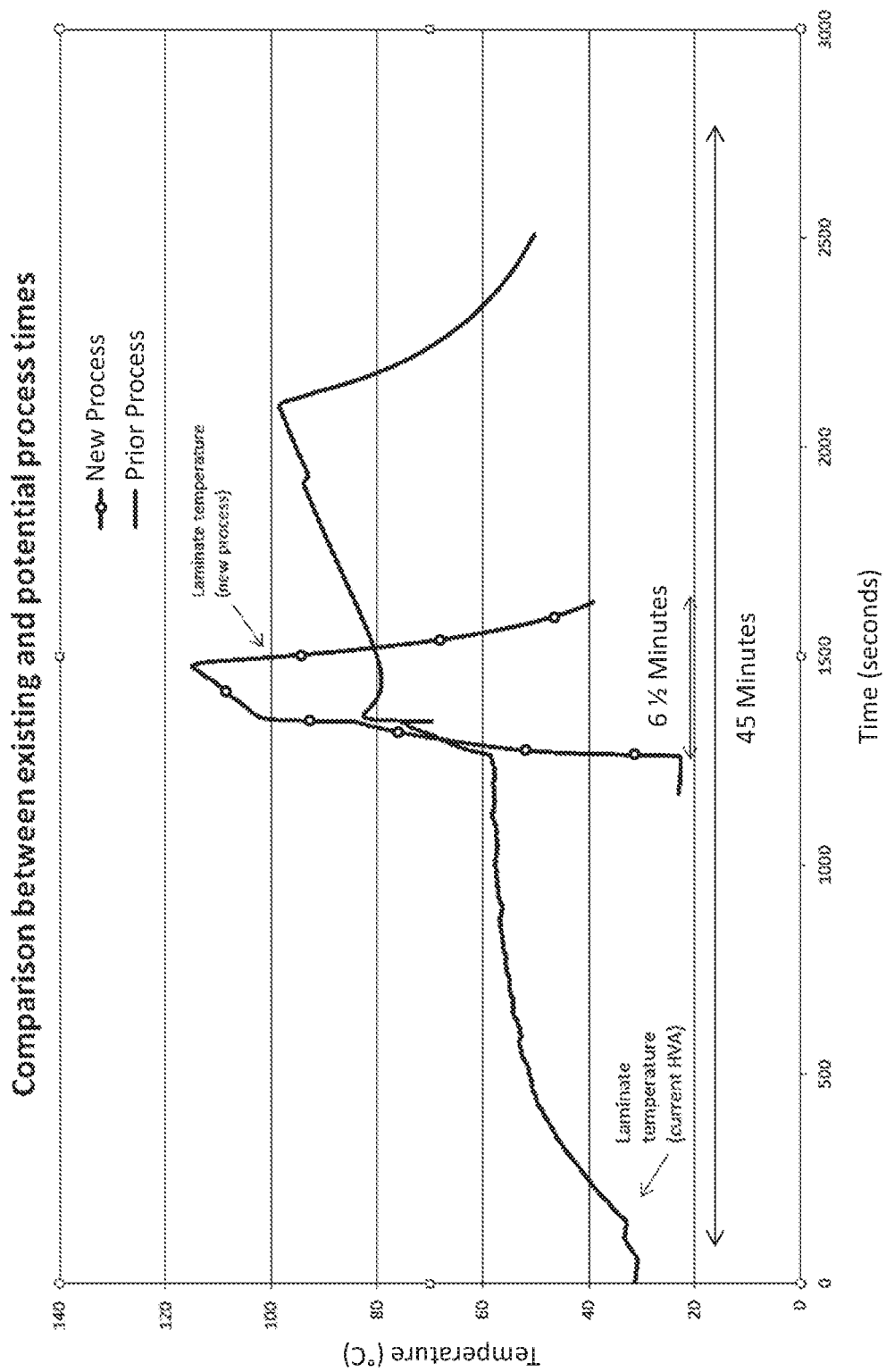
FIG. 11 is a graph plotting laminate temperature versus time for an inventive process as described herein and for a prior process for comparison.

FIG. 11 shows a plot of laminate temperature vs. time as measured for a prior process (see the temperature plot without circles) and for the new process (see the temperature plot with circles) described above as the inventive method or process. In the prior process, the membrane, laminate, and part as a stack were heated together until a critical activation temperature was reached at all regions of the laminate in contact with the part to melt and adhere the adhesive to the part thus bonding the laminate to the surface of the part, and the stack was then cooled, but the part was not preheated prior to introduction of the laminate. In each, the laminate is ultimately brought from room temperature (approx. 20° C.) to the glue activation temperature (above or near 100° C.) and then cooled to below 40° C. FIG. 11 shows the new process as completing such a cycle in approximately 6.5 minutes, while the prior process required approximately 45 minutes. Other tests have confirmed that processing times are reduced by the new process while the adhesion strengths of panels produced using the new process meet and exceed quality standards for adhesion of the laminate onto a substrate.

Various implementations of the inventive method or process, for example according to the methods 70 and 90, use a zoning technique to create temperature variations, which may be slight, moderate, or high, in the heated membrane 20 (for example with with differing membrane materials, thicknesses, colors, and heat intensities) and use this to influence slightly different heating characteristics of different areas of the substrate part 30. Zoned heating could be beneficial in refining the temperature increase experienced in different areas of a composite structure due to different ply thicknesses, etc. The zoning of contact pressure could be additionally or alternatively used to have a similar effect.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A method of laminating a contoured part, the method comprising the sequentially performed steps of:
    heating a flexible membrane;
    preheating the contoured part by positioning the heated flexible membrane into direct conformed contact with the contoured part;
    maintaining the heated flexible membrane in direct conformed contact with the contoured part to raise a surface temperature of the contoured part;
    moving the heated flexible membrane out of direct conformed contact with the contoured part;
    positioning a laminate between the heated flexible membrane and the contoured part;
    conforming, using the heated flexible membrane, the laminate to a surface of the contoured part; and
    heating the conformed laminate and contoured part to adhere the conformed laminate to the surface of the contoured part.

2. The method of claim 1, wherein the step of preheating the contoured part by positioning the heated flexible membrane into direct conformed contact with the contoured part comprises conforming the heated flexible membrane to the contoured part by applying a vacuum between the heated flexible membrane and the contoured part.

3. The method of claim 1, wherein the laminate comprises a first side for facing the contoured part, a second side for facing the heated flexible membrane, and a heat activated adhesive applied on the first side.

4. The method of claim 3, wherein the step of heating the conformed laminate and the contoured part comprises heating the heat activated adhesive at least to an activation temperature at which the heat activated adhesive melts.

5. The method of claim 4, wherein the step of heating the flexible membrane comprises heating the flexible membrane to a predetermined temperature that is greater than the activation temperature.

6. The method of claim 5, wherein the predetermined temperature is at least eighty degrees Celsius greater than the activation temperature.

7. The method of claim 6, wherein the predetermined temperature is at least one hundred degrees Celsius greater than the activation temperature.

8. The method of claim 7, wherein the predetermined temperature is at least one hundred and twenty degrees Celsius greater than the activation temperature.

9. The method of claim 1, wherein the method is carried out in an elevated temperature environment in an oven.

10. The method of claim 9, wherein the elevated temperature environment is sustained at around 80° C.

11. The method of claim 1, wherein the step of conforming the laminate to the surface of the contoured part comprises applying a vacuum between the heated flexible membrane and the contoured part.

12. The method of claim 1, wherein the step of heating the flexible membrane and the step of heating the conformed laminate and the contoured part comprise heating with a same heat source.

13. The method of claim 1, wherein the step of preheating the contoured part by positioning the heated flexible membrane into direct confirmed contact with the contoured part comprises conforming the heated flexible membrane to the surface of the contoured part.

14. The method of claim 13, wherein conforming the heated flexible membrane to the surface of the contoured part comprises applying a vacuum between the flexible membrane and the contoured part.

* * * * *